June 6, 1950  J. A. BOWER  2,510,678
WARE REMOVING AND FETTLING MECHANISM
FOR POTTERY FABRICATING MACHINES
Original Filed March 1, 1945  2 Sheets-Sheet 1

INVENTOR.
James A. Bower
BY
ATTORNEY.

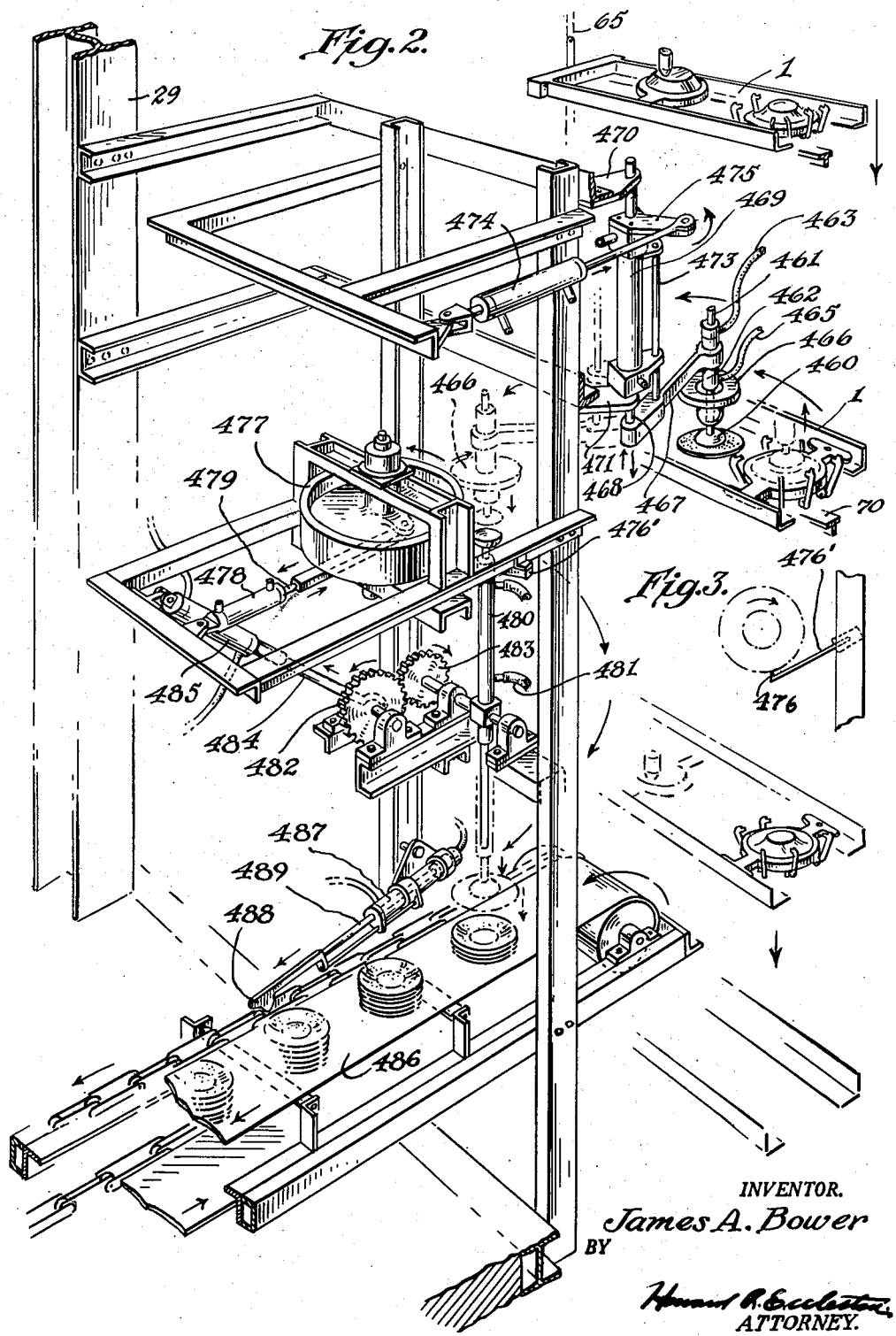

Patented June 6, 1950

2,510,678

UNITED STATES PATENT OFFICE 2,510,678

WARE REMOVING AND FETTLING MECHANISM FOR POTTERY FABRICATING MACHINES

James A. Bower, Chester, W. Va., assignor to The Taylor, Smith & Taylor Company, East Liverpool, Ohio, a corporation of West Virginia Original application March 1, 1945, Serial No. 580,401. Divided and this application May 1, 1947, Serial No. 745,154

13 Claims. (Cl. 25—104)

The invention relates to novel means for fettling ware, and novel means for removing ware from a pottery fabricating machine; the fettling operation being performed while the ware is in process of being removed. This application is a division of my application Serial No. 580,401, filed March 1, 1945, which has become abandoned.

My application Serial No. 580,401 discloses a completely automatic and integrated mechanism for fabricating pottery of either the vitreous or semi-vitreous type, and which is particularly well adapted to carry out the inventions described and claimed in my Patents Nos. 2,273,015 and 2,273,016, granted February 17, 1942.

In the machine shown in my application Serial No. 580,401, the molds are placed in trays and the trays are caused to travel step-by-step through the machine, and all operations necessary for complete fabrication of the ware, such as cleaning the molds, pouring the slip, opening and closing the molds, drying the ware, removing, fettling, inverting and stacking the ware, etc., are performed automatically.

The subject-matter of the present application relates to the removal of the ware, and the fettling of the ware, and one of the objects of the invention is to provide in an automatic pottery fabricating machine means for automatically removing the ware, means for automatically fettling the ware, and means for automatically inverting the ware.

Another object of the invention is to provide means by which the fettling operation will be performed during the process of removing the ware from the pottery fabricating machine.

Various other objects and advantages of the invention will be apparent to those skilled in the art from the following detailed description when taken in connection with the accompanying drawings, in which:

Figure 2 is a perspective view of a portion of the power end of the machine, depicting one of the six units for removing the biscuit ware, fettling the same, and stacking it on a conveyer for delivery to a firing kiln; and Figure 3 is a detail view of the fettling tool.

Figure 1:
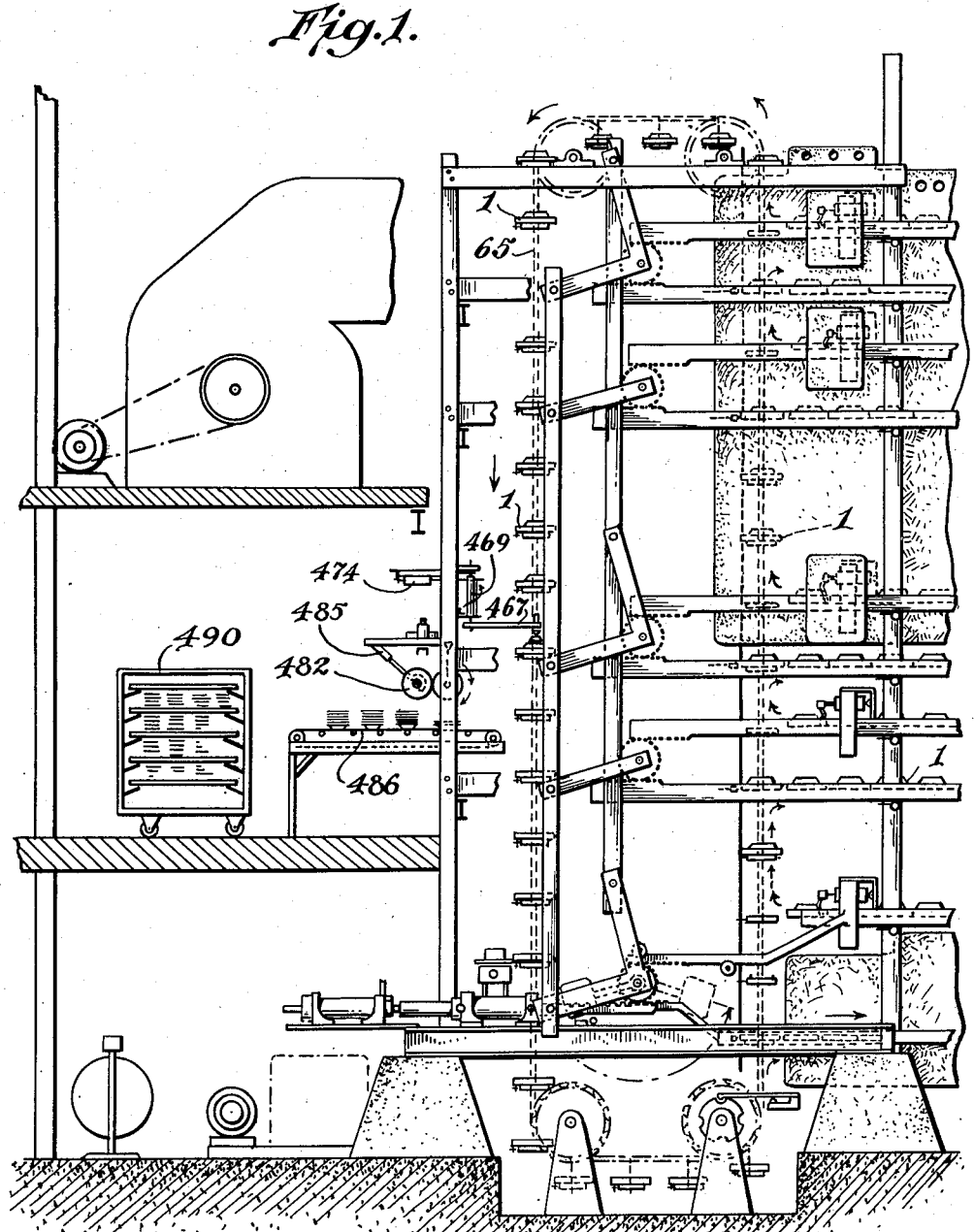
Figure 1 is a side elevational view of the power end of the apparatus, from which the ware is removed, and illustrating generally the ware removal means in combination with the pottery fabricating machine.

As illustrated in my application Serial No. 580,401 the desired number of molds, six in the specific embodiment, are placed in trays 1. The main frame of the apparatus comprises a track composed of ten vertically spaced track sections or guideways upon which the mold-carrying trays are pushed along in a step-by-step movement so as to provide dwell points or stations, throughout the continued operation of the apparatus. As each tray reaches the end of a particular track, except the top one, it is moved upwardly to the next track, by vertically disposed conveyers at opposite ends of the machine.

All of the operations necessary to the complete fabrication of the ware are performed during the passage of the ware through the apparatus. After leaving the drying zone the trays are pushed one by one from the uppermost track section onto the endless vertical conveyer 65 shown in Figures 1 and 2. One flight of this vertical conveyer carries loaded trays of molds upwardly, step-by-step, from one track section to another, while the descending flight carries loaded trays downwardly, step-by-step, from the uppermost track section. Of course, the molds have been opened before the trays are positioned on the descending flight of the conveyer 65, and associated with the descending flight, at the desired dwell point, is mechanism for removing the ware from the molds on the conveyer, for inverting the ware and stacking it on a conveyer in the proper height stacks, ready for firing in the kiln, and mechanism for fettling the ware during the removal operation. The invention with which this present divisional application is concerned relates to the mechanism for removing, fettling, and inverting the ware, and the preferred form of such mechanism will now be described.

The take-out mechanism is mounted on the main frame of the machine. As stated hereinbefore, there are six molds in each tray in the specific embodiment illustrated in my parent application, and therefore there are, of course, six of these take-out devices and associated parts, one for each line of ware coming through the machine, but inasmuch as they are identical, only one has been shown.

The ware is engaged by a vacuum head 460 mounted on the lower end of a hollow piston rod 461 of a cylinder 462. A tube 463 connects the interior of the piston rod with a source of vacuum. When the vacuum is applied the ware will be gripped ready for lifting, and when the vacuum is broken the ware will be released.

A tube 465 connects the lower end of the cylinder 462 with a pressure system. A cylinder 469, to be later described, lifts the ware, and the purpose of cylinder 462 is to raise the vacuum heads after the ware has been transferred and released, and to lower the vacuum head into engagement with the next piece of ware to be transferred. It will be understood that when the vacuum head is over the mold, and pressure is released from the lower end of the cylinder 462, through the tube 465, the piston rod with the vacuum head will move downwardly until the vacuum head engages the ware to be transferred, so that the mechanism thus adjusts itself to ware of different heights. A wheel 466 is connected to the piston rod 461, for a purpose described hereinafter.

Cylinder 462 is supported in the outer end of an arm 467, the inner end of the arm being fixed to the lower end of a piston rod 468 of the hydraulic cylinder 469 which operates to lift the ware from the mold. This cylinder is supported on the upper and lower brackets 470 and 471, the piston rod 468 of the cylinder extending through the brackets so that the cylinder is free to turn about its axis. A rod 473 fixed to lugs on cylinder 469 and to the arm 467 insures a rigid connection between these parts. Oscillation of cylinder 469 about its axis is provided by a cylinder 474 pivotally connected to the frame of the take-up and having the free end of its piston rod pivotally connected to an arm 475 on cylinder 469. Operation of cylinder 474 will thus serve to move the vacuum head 460, and the ware carried thereby, to the dotted line position indicated in Figure 2.

When the ware is moved to the dotted line position it is fettled by a knife or other fettling tool 476 secured to a spring arm 476' or other automatically adjustable mounting so that the knife automatically adjusts itself to ware of different sizes. Also mounted on the frame of the machine is a drive wheel 477 adapted to frictionally engage and drive a wheel 466 fixed to piston rod 461 which carries the vacuum head 460. The wheel 477 is caused to oscillate by a cylinder 478 which has its piston rod 479 pivotally connected to an arm fixed to the hub of wheel 477. Movement of the piston rod 479 in one direction will cause the rotation of the ware against the fettling tool 476 thereby removing any rough parts. The ware is then released by the vacuum head, and wheel 47 is returned to its original position by movement of piston rod 479 in the opposite direction.

The ware is cast in upside-down position in the molds and remains in that position up to and including the fettling operation. Thereafter the ware is inverted and stacked on a conveyer in piles of six articles to a pile. The inverting mechanism comprises a tube 480 pivotally mounted in bearings on the take-out frame, and connected with a source of vacuum by means of a pipe 481. The tube may be oscillated about its pivot by a pair of meshing gears 482—483, the driving gear 482 of which is oscillated about its axis by the piston rod 484 of hydraulic cylinder 485 which is pivotally mounted on the frame of the machine. When the vacuum is released on head 460 it is applied to tube 480 through pipe 481 and the particular piece of ware is thus transferred to the tube. At this particular time the tube 480 is in the full line position indicated in Figure 2. The cylinder 485 is now operated to drive gear wheels 482 and 483 and thereby swing the tube 480 through an angle of 180° to the dotted line position indicated. In this position the vacuum is broken and the piece of ware is deposited on the conveyer 486.

The means for operating the conveyer 486 comprises a hydraulic cylinder 487 pivoted on the frame of the take-out device, and a pawl 488 fixed to the free end of the piston rod 489 of this cylinder. The various elements of the take-out and fettling device are of course timed to operate in proper sequence, but the cylinder 487 is timed to operate only after six operations of the other elements, so that six articles will be deposited in each stack.

The ware stacked on the six conveyers 486 may be transferred to stilliards 490 and transported to a firing kiln.

From the foregoing description it will be apparent that I have devised in an automatic pottery fabricating machine, means for automatically removing the ware from the molds, means for automatically fettling the ware, and means for automatically inverting the ware. And it will also be apparent that the fettling operation is performed during the operation of removing the ware, and that the mechanism for removing, fettling, and inverting the ware is operative irrespective of the size of the ware.

In accordance with the patent statutes I have described what I now believe to be the preferred form of the invention but inasmuch as various changes and modifications may be made in the construction without departing from the spirit of the invention, it is intended that all such changess and modifications be included within the scope of the appended claims.

What I claim is:

1. In a pottery machine for fabricating table-ware, a take-out device for removing a piece of table-ware from a mold on the machine, said take-out device including means for gripping the ware, a fettling tool, means to move the take-out device to bring the ware into cooperative relation with the fettling tool, and means for rotating the ware while carried by the gripping means of the take-out device to fettle the ware.

2. In a pottery machine for fabricating table-ware, a take-out device for removing a piece of table-ware from a mold on the machine, said take-out device including means for gripping the ware, an automatically adjustable fettling tool, means to move the take-out device to bring the ware into cooperative relation with the fettling tool, and means for rotating the ware while carried by the gripping means of the take-out device to fettle the ware.

3. In a pottery machine for fabricating table-ware, a take-out device for removing a piece of ware from a mold on the machine, said take-out device including a vacuum head for gripping the ware, a fettling tool, means to move the take-out device to bring the ware into cooperative relation with the fettling tool, and means for rotating the ware while carried by said vacuum head of the take-out device to fettle the ware.

4. In a pottery machine for fabricating table-ware, a take-out device for removing a piece of table-ware from a mold on the machine, a wheel connected with the take-out device, a fettling tool, means for presenting the ware to the fettling tool while carried by the take-out device, and means engaging and rotating said wheel to rotate the piece of ware relative to the fettling tool.

5. In a pottery machine for fabricating table-ware, a take-out device including a vacuum head for engaging and removing a piece of table-ware in a mold on the machine, a wheel connected with the take-out device, a fettling tool, means for presenting the ware to the fettling tool while carried by the vacuum head of the take-out device, and means for engaging and rotating said wheel to rotate the piece of ware relative to the fettling tool.

6. In a pottery machine for fabricating table-ware, a take-out device for removing a piece of table-ware from a mold on the machine, said take-out device including means for gripping the ware, a fettling tool, means to move the take-out device to bring the ware into cooperative relation with the fettling tool, means for rotating the ware while carried by the gripping means of the take-out device to fettle the ware, and ware inverting means receiving the ware from the take-out device.

7. In a pottery machine for fabricating table-ware, ware-transfer mechanism including a take-out device for removing table-ware from a mold on the machine and ware-inverting means receiving the ware from the take-out device, said ware-inverting means including an arm mounted on a horizontal pivot, means on the upper end of the arm for gripping a piece of ware released by the take-out device, means for swinging said arm about its horizontal pivot through an arc of substantially 180°, a fettling tool, and means for relatively rotating the fettling tool and the ware while the ware is held by the ware-transfer mechanism.

8. In a pottery machine for fabricating table-ware, a take-out device including a vacuum head for engaging and removing a piece of table-ware from a mold on the machine, a fettling tool, means for presenting the piece of ware to the fettling tool while carried by the vacuum head of the take-out device, a second vacuum head receiving the piece of ware when released by the first-mentioned vacuum head, and means for swinging the second vacuum head downwardly through substantially 180°.

9. In a pottery machine for fabricating table-ware, means for removing table-ware from molds on the machine and inverting the ware, a fettling tool, and means for rotating the ware in contact with the fettling tool during the operation of removal.

10. The combination of a pottery machine for fabricating table-ware, molds included in said machine, and means for removing table-ware from said molds and stacking the removed ware.

11. The combination of a pottery machine for fabricating table-ware, molds included in said machine, and means for removing table-ware from said molds and inverting and stacking the removed ware.

12. The combination of a pottery machine for fabricating table-ware, molds included in said machine, a conveyer movable step-by-step, means for removing the articles from the molds and arranging them in stacks of the desired number of pieces on said conveyer, and means for moving the conveyer one step after each stack is completed to thereby form a series of stacks.

13. The combination of a pottery machine for fabricating table-ware, molds included in said machine, a take-out device for removing table-ware from said molds, and ware-stacking means, said take-out device delivering the ware to the ware-stacking means.

JAMES A. BOWER.

REFERENCES CITED

The following references are of record in the file of this patent:

UNITED STATES PATENTS

| Number | Name | Date |
|---|---|---|
| 1,129,208 | Kunkle | Feb. 23, 1915 |
| 1,130,383 | Ellison | Mar. 2, 1915 |
| 1,524,877 | Norton | Feb. 3, 1925 |
| 1,532,255 | Miller | Apr. 7, 1925 |
| 1,543,425 | Cristiani | June 23, 1925 |
| 1,565,738 | Haney | Dec. 15, 1925 |
| 1,601,812 | Cristiani | Oct. 5, 1926 |
| 1,630,436 | King | May 31, 1927 |
| 1,648,966 | Southwick | Nov. 15, 1927 |
| 1,788,228 | Berkenvelder | Jan. 6, 1931 |
| 1,836,690 | Talbot | Dec. 15, 1931 |
| 1,888,393 | Strickland | Nov. 22, 1932 |
| 1,921,393 | Lorenz | Aug. 8, 1933 |
| 1,947,610 | McNamara | Feb. 20, 1934 |
| 2,164,285 | Schutz | June 27, 1939 |
| 2,259,728 | Bridges | Oct. 21, 1941 |
| 2,303,186 | Williams | Nov. 24, 1942 |
| 2,325,774 | Hohl | Aug. 3, 1943 |
| 2,361,311 | Miller | Oct. 24, 1944 |